Jan. 6, 1931.    W. J. P. MOORE    1,787,638
SELF-ALIGNING HOLLOW SPHERE BEARING PISTON
Filed Feb. 21, 1929
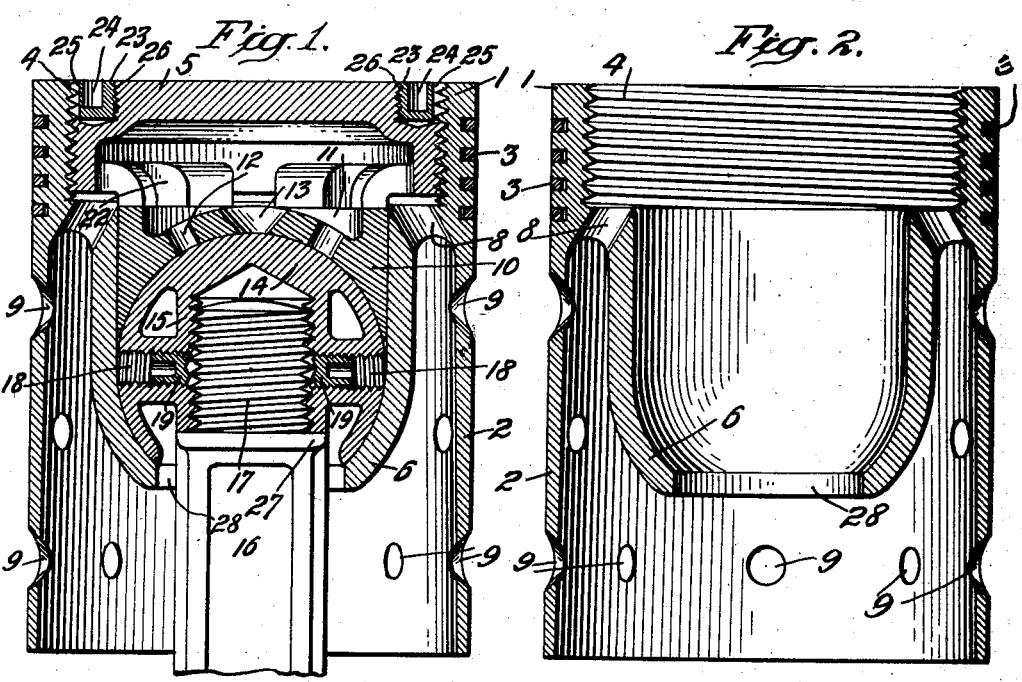
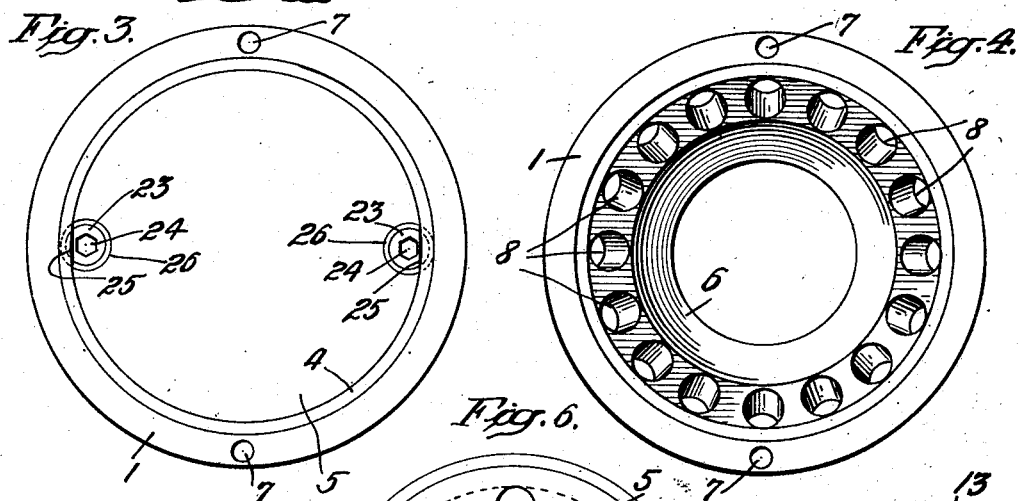
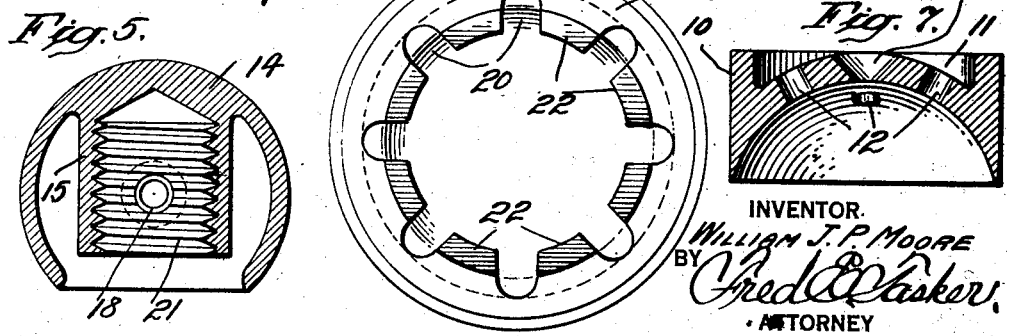
INVENTOR.
WILLIAM J. P. MOORE
BY Fred E. Tasker
ATTORNEY Patented Jan. 6, 1931

1,787,638

UNITED STATES PATENT OFFICE

WILLIAM J. P. MOORE, OF NEW YORK, N. Y.

SELF-ALIGNING HOLLOW-SPHERE BEARING PISTON

Application filed February 21, 1929. Serial No. 341,722.

My invention relates to new and useful improvements in pistons for engines or motors of various kinds, especially internal combustion engines.

It relates more particularly to that class of pistons in which the piston rod is connected to the piston by means of a hollow sphere or ball instead of by means of the usual cylindrical piston pins working in bosses cast at opposite points on the piston wall, the spherical or ball bearing having numerous points of superiority over the other common form of cylindrical bosses or connection.

My improved self-aligning hollow sphere bearing piston has many improvements in the construction and design of engine pistons. These improved details are intended to overcome defects in the present form of engine pistons with cylindrical piston pins, which have their heavy and separate piston pin bosses concentrated and cast on the opposite sides of the thin piston wall, thereby producing serious shrinkage strains in the casting and further distortion in the side walls under all working conditions and requiring special relieving spaces around the concentrated bearing bosses, each form or design or shape of piston requiring a special relieving means. Another and greater defect of the cylindrical pins and bosses is that no matter how true and accurately the piston walls may be machined or how carefully finished, the moment the piston is heated or put into working operation, it distorts out of round due to the concentrated heavy bosses and the unequal working strains carried by the thin side walls, so that all the benefits of careful machining and accuracy of finish are lost.

A still further and more serious defect is that no matter how carefully the pin is aligned in relation to the side walls of the piston and the cylinder walls, any springing or misalignment of the crank shaft pin or crank shaft bearings produces excessive strains in the piston pin bearings and distortion in the thin side walls of the piston, and causes piston side slap, as well as unequal wear and strain in the piston pin and piston pin bosses. All crank shafts under all normal working conditions will distort or spring more or less, so that the foregoing conditions always exist in engine pistons having cylindrical piston pins. The perfect alignment needed for the parts is further seriously affected by the misalignment and distortion of the main engine and cylinder castings. These defects are effectually and completely overcome by my improved self-aligning hollow sphere bearing piston, as I shall hereinafter point out.

My invention may therefore be said to consist essentially in the construction, combination and arrangement of parts, substantially as will be hereinafter described and claimed.

In the accompanying drawing illustrating my invention:

Figure 1 is a vertical section of my improved hollow sphere bearing piston completely assembled and the piston rod in connection therewith.

Figure 2 is a similar detail section of the piston shell alone, with its head removed, and omitting the hollow sphere and other removable parts.

Figure 3 is a top plan view of the piston and piston head.

Figure 4 is a top plan view with the head removed to show the interior construction.

Figure 5 is a detail sectional view of the hollow sphere bearing member carried on the end of the piston connecting rod.

Figure 6 is an inverted detail bottom plan view of the screw head of the piston.

Figure 7 is a cross-sectional detail view of the semi-spherical bearing cap that rests on top of the hollow sphere, and against which the piston head is screwed down.

Like characters of reference denote like parts throughout all the different figures of the drawing.

The body of the piston is a hollow cylinder of any desired length and diameter, permanently open at one end, while the other end is closed by a removable screwed in head. The walls are of uniform thickness transversely from the top to the bottom, and have no concentrated or unequally thick bosses to provide cylindrical pin bearings and are therefore not subject to shrinkage strains in casting. The end portion 1 which receives the removable head 5 is necessarily thicker than the rest of the wall on account of the piston ring and is internally-screwthreaded at 4, while the outside of this portion carries one or more piston rings 3. The wall of this body from the thickest section 1 to the other end of skirt 2 is of a reduced thickness, gradually tapering to the end. The piston body in all normal sizes used in automobile or airplane engines is very easily pressed, and in sizes around three inches in diameter, so commonly used, the appearance of the pressed piston body and the problems involved in making the same are very much those of the famous "75" shells used in warfare.

With this construction of piston body all load strains are continuously and uniformly carried by the cylindrical side wall throughout their entire circumference and can produce no unequal strain or distortion at any one point in the thin side wall; and therefore the piston walls once they are machined and finished true and round remain so and are not unequally distorted or strained under any normal working conditions. The skirt of the piston wall, as 2, is continuous throughout its entire length and circumference, thus giving a maximum of wearing and bearing surface, and the self aligning insures uniformity of bearing pressure throughout the entire area.

The side wall or skirt 2 can be made very light below the piston ring area, as it is not subject to undue shrinkage strains or unequal load strains, and having a continuous surface of extra large area, extra thickness is not required for carrying away the heat, but only sufficient strength so that they will not crush under working conditions. Further, owing to the cylindrical form of the skirt and the fact that these side walls are only subject to compression or crushing strains, below the piston ring area they may be made of a tapering thickness and approaching egg shell thinness at the bottom of the piston and therefore of the lightest possible construction.

The piston body and its head may be made of a cast or forged metal, and finished all over, in order to insure absolute uniformity in weight, all operations being simple lathe or grinding processes and of the quickest and cheapest kind, and no cross boring is required. The construction can be made as a cast metal, either in cast iron or cast aluminum or a forged or pressed metal in steel or duralumin; but preferably of aluminum alloy on account of the great saving in weight, as with high engine speeds the weight of the reciprocating parts practically determines the maximum speed at which the engine can be run.

Inside of the body 2 is an integral cylindrical and partially spherical bearing wall 6, of substantial strength, and concentric with the skirt 2. The end of member 6 nearest the head 5 is united with skirt 2 by an annular ring or diaphragm which bridges the space between the integral bearing wall 6 and piston wall 2 and is provided with a series of oil holes 8. The other end of member 6 is open at 28 to allow the loose entry of connecting rod 16, said end of member 6 having an internal partly spherical surface to support the lower portion of the hollow sphere 14 carried on the end of connecting rod 16. Inside of inner cylinder 6 the semi-spherical bearing cap 10 rests on sphere 14, so that the sphere 14 oscillates between the semi-spherical inner end of partition 6 and the semi-spherical cap 10, see Figure 1.

The piston head 5 is screw threaded to engage the threads 4 in the end of the piston shell 1, so that head 5 may screw firmly into the piston, and may hold firmly down on cap 10 and sphere 14. Due to the fine threads of the piston head it can be adjusted to a nicety, the same as the cap on the end of the connecting rod. When the head 5 is properly adjusted it is locked in place by two hollow set screws 23, having hexagonal wrench holes 24 therein. These screws 23 screw into threaded openings 26 in the edge of the head 5 near the threads 4. The set screws 23 are flattened on one side at 25, and when slightly turned their threads will bite into the thread 4 on the piston body and securely lock head 5 in position; also when released the hollow openings 24 of the set screws hold the wrench used in demounting or assembling the complete unit.

Thus the piston head 5 is of the simplest form and very easily and cheaply pressed. As shown in Figure 6 its under or inner side has a series of projections 22, between openings 20, that bear down on the cap 10 to hold the latter in place. The separate and removable piston head has many advantages in itself, besides providing for top accessibility to all inner piston parts, and especially in that it produces less distortion in the piston head due to the unequal heating at different points of the piston head.

The central part of a piston head must always be hotter and expand to a greater degree than the side walls nearer the jacket, and when the main piston body and the piston head are cast as a unit the greater expansion near the center of the head communicates to the extreme edges of the piston body, causing an undue distortion of the entire head end of the piston. To counteract this it is common practice to recess the top end of the side wall above the top piston ring; and also to make the entire piston head unduly thick to provide for a greater mass or volume of metal to assist in carrying off the excessive heat of the central portion of the piston head.

The separate screwed in piston head completely compensates this undue distortion, because the central hot portion of the piston head can expand independently of the cooler side wall, because there is sufficient space between the ends of the threads on the piston head and those on the piston body to allow the piston head, as 5, to expand without communicating this expansion to the cooler piston body, while at the same time there is complete contact between the V's of the threads to carry off all heat as efficiently as with a solid integral head piston.

The top edge of the piston body part 1 is provided with two small drilled holes 7, 7, on opposite sides for inserting a wrench or spanner for holding the piston body in assembling and demounting the complete piston; and this is done to hold the piston body firmly while another wrench is operating with the hollow set screws 23 to release or fasten the piston head 5 in place. Thus it will be seen how a removable piston head enables the complete piston unit to be assembled or disassembled from the top side, and it is never necessary to approach any part of the piston or its assembly from the bottom side of the engine. By merely removing the cylinder head any adjustments can be made in case of necessity, and in fact the entire piston body, piston rings, hollow sphere and other parts may be completely removed from the top side; for after removing the piston head and the upper semi-spherical bearing cap, the piston body can be dropped down to give access to the hollow sphere or ball and the connecting rod.

The piston body side wall or skirt 2 is provided with a series of truncated conical or taper holes 9, having the larger diameter at the outside surface of side wall 2 and against the enclosing cylinder wall. These holes produce a series of small pockets for collecting the oil splashed into the inside of the piston. By a proper arrangement this supplies a continuous film of oil over the entire area of the surface of the piston and cylinder walls; and it is a well known fact that such a continuous film of oil is practically a cure for piston side slap.

The semi-spherical bearing cap which fits down into the cylindical inner integral piston member 6, to hold the hollow sphere 14 from above, is preferably of hard cast iron or steel. It has a recessed top 11. See Figure 7. This recess 11 permits the accumulation of the oil splashed and thrown through the many inclined holes in the diaphragm annulus between the piston skirt 2 and inner member 6, or these holes 8 are at the point where the piston body wall joins the lower bearing cup for the hollow sphere 14. These holes 8 cause a continuous supply of oil to be splashed to the recessed top 11 of the bearing cap 10, and which through the holes 12 and 13 in the cap 10 this cap 10 distributes the oil to the upper and also to the lower half of the hollow sphere or ball 14.

I pass now to a brief study of the feature which may be assumed to be perhaps the most important element in the combination of elements making up my invention, namely, the hollow sphere or ball 14 which is carried on the end of the piston connecting rod 16 to constitute a loose pivotal or universal ball joint connection between the connecting rod 16 and the spherical parts in piston 14. This element is usually and preferably a hollow sphere, as shown, which is truncated or sliced off to permit the rod 16 to enter it, said rod having a shoulder against which the sphere 14 is screwed on tight. It will be noticed however that the element 14 may be a solid ball, or may consist of interconnected parts, or may have only a partial spherical curvature which will correspond to one or more spherical pieces holding it.

The hollow sphere 14, when of this preferred form and structure, forming a self-aligning spherical bearing, is very light, and as the spherical surface is subject only to compression of crushing strains it can also be made very thin, and it has many advantages over the cylindrical piston pin, besides the very important advantage of self-aligning.

The hollow sphere 14 has an inner cylindrical or sleeve like center 15, which has an internal screw thread 21, whereby the sleeve 15 screws on the thread 17 of rod 16 down against the shoulder on rod 16. The sphere 14 is therefore substantially hollow, and I term it a hollow sphere. It has on opposite side holes 18, in which are hollow set screws 19 that engage the threads 17 of rod 16. Hence the hollow sphere is screwed on the upper end of the connecting rod 16 against a shoulder thereon, and is locked in position by the two hollow set screws. The main load of the downstroke is taken directly on the connecting rod shoulder, and it is only on the up stroke or lighter load that the strain comes on the threads.

The hollow sphere bearing perfectly compensates for any misalignment of cylinder walls, main engine casting, crank shaft and crank pin, or the springing of the crank shaft under load, or any misalignment due to bad workmanship, and it completely overcomes piston "side slap". Its perfect operation is not affected by bad manufacture, for should the center of the hollow sphere not be concentric with the center of the piston body, it would automatically adjust itself to this error, as well as to errors or misplacements of other parts.

The hollow sphere 14 provides a much greater wearing surface than is possible with a cylindrical piston pin, so that the load per square inch is therefore decreased, and the life of the wearing elements is greatly increased. The increase in wearing surface is much greater than seems possible from a casual consideration. The wearing surfaces are constant, and are always in contact throughout their entire area. In operation they tend to wear in and acquire hard and mirror like surfaces, and they will wear for an almost indefinite time without adjustment.

Many changes in the details may be made without exceeding the scope of the claims; especially variations in the form, relation, and character of the parts.

What I claim, is:

1. A piston consisting essentially in a hollow cylinder having an integral inner concentric cylinder wall formed with a partly spherical lower end, a removable head in one end of the cylinder, a semi-spherical bearing cap beneath said head, a piston rod, and a spherical member carried thereon, which is supported between the semi-spherical cap and the lower partly spherical cylindrical inner member of the piston.

2. In a piston of the class described, the combination of a hollow cylinder having an integral inner concentric sleeve-like wall whose connection with the cylinder is a diaphragm annulus provided with lubricant openings, and whose inner lower bearing portion is curved to correspond to the shape of the piston rod sphere, a removable screw-threaded head in one end of said cylinder, an inner upper spherical cap for the piston rod sphere, having lubricant openings, and a hollow sphere within the upper and lower spherical bearing surfaces, together with a rod to which the hollow sphere is secured.

3. In a piston of the class described, the combination of a hollow cylinder having an integral open-ended inner concentric end, the connection between them having a series of lubricant passages, and the inside of the inner wall being curved near the bottom to provide a lower bearing for the spherical joint member, an upper independent spherical cap for said member, said cap being perforated, the spherical joint member movable within the said upper and lower spherical services, and a piston rod which is threaded to engage said spherical joint member.

4. A piston comprising essentially a hollow cylinder having an integral inner concentric sleeve curved within to provide the lower part of a socket, a removable head in one end of the cylinder, an upper curved member within the upper part of the inner sleeve to provide the top of this socket, a spherical member in said curved socket, and a rod carrying said spherical member.

5. A piston comprising essentially a hollow cylinder, a removable head screwed into one end thereof, the skirt of the cylinder below said head being tapering and provided with transverse conical oil holes having their widest end on the outside surface of said skirt, so that the splashed lubricant may diffuse itself over the outer surface of said skirt.

6. In a piston of the class described, the combination with a hollow cylinder body, of a removable screw head, an inner lower bearing integrally united with the body and having at the point of union a series of oil holes, an inner upper bearing arranged opposite to the lower bearing and having a recessed top face and oil holes and a hollow sphere oscillating between said upper and lower bearing members, together with a rod carrying said hollow sphere.

7. In a piston of the class described, the combination with a hollow cylindrical body having a thicker section near the head, of a removable threaded head which screws into the body, flat-sided screws engaging the threads of the head to lock the head in place, an inner lower partly spherical bearing integrally united with the body, an inner upper removable partly spherical bearing arranged opposite to the lower bearing and held in place by the head, and a ball or sphere movable between the two bearing members.

8. A piston comprising essentially a hollow cylinder, a removable head in one end thereof, a partly spherical support in the cylinder and integral therewith, a removable semi-spherical bearing cap beneath and held in place by said head, in combination with a hollow spherical member movably carried in said partly spherical support and beneath said semi-spherical bearing cap, and a piston rod on which the hollow spherical member is mounted.

In testimony whereof I hereunto affix my signature.

WILLIAM J. P. MOORE.